United States Patent [19]
Senda

[11] 3,729,982
[45] May 1, 1973

[54] APPARATUS FOR ACCURATE DETERMINATION OF ABSOLUTE DENSITY OF A FLUID

[75] Inventor: Osamu Senda, Tokyo, Japan

[73] Assignee: Agency of Industrial Science and Technology, Tokyo, Japan

[22] Filed: Sept. 10, 1971

[21] Appl. No.: 179,326

[30] Foreign Application Priority Data

Sept. 11, 1970 Japan..............................45/079229

[52] U.S. Cl......................................73/32, 73/67.2
[51] Int. Cl................................................G01n 9/00
[58] Field of Search..................................73/32, 67.2

[56] References Cited

FOREIGN PATENTS OR APPLICATIONS

| | | | |
|---|---|---|---|
| 40/26012 | 10/1965 | Japan | 73/32 |
| 41/18531 | 4/1966 | Japan | 73/32 |
| 1,126,450 | 9/1968 | Great Britain | 73/32 |

Primary Examiner—Richard C. Queisser
Assistant Examiner—John P. Beauchamp
Attorney—Kurt Kelman

[57] ABSTRACT

In a vacuum vessel, a pipe and a bar which have the same outside diameter and are made of the same material are disposed parallelly to each other, with the ends thereof fixedly fastened to the side walls of the vessel. Said pipe and bar are provided with vibrating means which cause the pipe and the bar to vibrate. The pipe is first vibrated when the pipe interior is devoid of matter. The inside diameter of the pipe is determined indirectly from the consequent frequencies of the pipe and the bar. The pipe is then filled with a fluid whose density is to be determined and it is thereafter vibrated. The absolute density of the fluid contained in the pipe is directly determined with high accuracy on the basis of the frequency of the pipe in the packed state and the former frequency of the pipe in the empty state.

2 Claims, 6 Drawing Figures

APPARATUS FOR ACCURATE DETERMINATION OF ABSOLUTE DENSITY OF A FLUID

The present invention relates to an apparatus employing a vibratory method for direct, accurate determination of the absolute density of a fluid.

Heretofore, it has been customary to find the specific gravity of a given fluid with reference to a standard fluid and determine the density of that fluid indirectly on the basis of its specific gravity. The devices suggested to date for direct determination of the density of a fluid are very few.

It is a main object of the present invention to provide an apparatus for the determination of the density of a given fluid, which apparatus is so designed as to enable the determination of the absolute density of the fluid to be accomplished directly and easily with high accuracy.

It is another object of the present invention to provide an apparatus for the determination of density, which is capable of easily determining the absolute density of gases having low values of density.

It is still another object of the present invention to provide an apparatus for the determination of the absolute density of a fluid, which apparatus is capable of eliminating possible error caused in the course of determination by variation in temperature.

The other objects and characteristics of the present invention will become apparent from the further description of this invention given in detail hereinafter with reference to the accompanying drawing, wherein.

Figure 1:
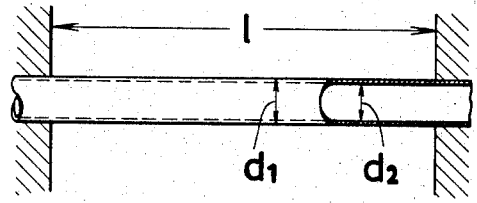
FIG. 1 is an explanatory view illustrating the operating principle of the present invention.

Referring to FIG. 1, a pipe having uniform inside and outside diameters has its ends fixedly fastened as illustrated. As is already known, the frequency $f$ of this pipe produced in a vacuum is calculated, in accordance with the Formula (1) given below.

$$f = J\sqrt{EI/\rho a l^4} \qquad (1)$$

wherein, $J$ stands for a constant which is determined by the mode of vibration, $I$ for the second moment of area of the pipe, $E$ for Young's modulus, $\rho$ for the density of the material of which the pipe is made, $a$ for the area of the cross section of the pipe, and $l$ for the length of the vibrating portion of the pipe.

If the pipe is assumed to have a uniform area of cross section throughout the entire length, then the mass $m$ of the vibrating portion of this pipe is expressed as the product of the density $\rho$ of the material of pipe multiplied by the area $a$ of the cross section of the pipe and the length $l$ of the vibrating portion of the pipe ($m = \rho \cdot a \cdot l$). By substituting the mass $m$ in Formula (1) above, therein derived the equation shown below as Formula (2).

$$f = J\sqrt{EI/m\, l^3} \qquad (2)$$

If the hollow interior of pipe is packed with a fluid, the total mass subjected to vibration is the sum of the mass $m$ of the vibrating portion of the pipe and the mass $\Delta m$ of the vibrating portion of the fluid ($m + \Delta m$). This means that the pipe has its mass $m$ apparently increased by an increment $\Delta m$.

As a result of this increase in mass, the frequency $f_x$ of the pipe is now expressed by an equation shown below as Formula (3).

$$f_x = J\sqrt{\frac{EI}{(m+\Delta m)l^3}} = J\sqrt{\frac{EI}{m\left(1+\frac{\Delta m}{m}\right)l^3}} = f\sqrt{\frac{1}{\left(1+\frac{\Delta m}{m}\right)}} \qquad (3)$$

Let $d_1$ and $d_2$ stand for the outside diameter and the inside diameter respectively of the pipe and $\rho_x$ for the density of the fluid, then the mass $m$ of the pipe and the mass $\Delta m$ of the fluid will be given by the Formulas (4) and (5) respectively.

$$m = \rho l(\pi/4)(d^2_1 - d^2_2) \qquad (4)$$

$$\Delta m = \rho_x l(\pi/4) \cdot d^2_2 \qquad (5)$$

Substitution in Formula (3) results in Formula (6).

$$f_x = f\sqrt{\frac{1}{\left(1+\frac{\Delta m}{m}\right)}} = f\left\{1 + \frac{\rho_x}{\rho\left[\left(\frac{d_1}{d_2}\right)^2 - 1\right]}\right\}^{-\frac{1}{2}}$$

$$= f\sqrt{\frac{1}{1 + \frac{\rho_x}{\rho} \cdot \frac{1}{\left[\left(\frac{d_1}{d_2}\right)^2 - 1\right]}}}$$

$$f^2_x = f^2 \cdot \frac{1}{1 + \frac{\rho_x}{\rho} \cdot \frac{1}{\left[\left(\frac{d_1}{d_2}\right)^2 - 1\right]}} \qquad \frac{f^2}{f^2_x} = 1 + \frac{\rho_x}{\rho} \cdot \frac{1}{\left[\left(\frac{d_1}{d_2}\right)^2 - 1\right]}$$

$$\rho_x = \rho\left[\left(\frac{d_1}{d_2}\right)^2 - 1\right]\left[\left(\frac{f}{f_x}\right)^2 - 1\right] \qquad (6)$$

As is evident from the foregoing explanation, the density $\rho_x$ of a given fluid can readily be calculated in accordance with Formula (6) by determining the frequency $f$ of the pipe in its empty state and the frequency $f_x$ of the same pipe when it is filled with fluid so far as the outside diameter $d_1$ and the inside diameter $d_2$ respectively of the pipe and the density $\rho$ of the pipe are known accurately in advance.

The density $\rho_x$ of the material of the pipe and the outside diameter $d_1$ of the pipe can be determined with a fair degree of accuracy by conventional methods. On the other hand, it is difficult to obtain accurate determination of the inside diameter $d_2$ of the pipe. The difficulty in obtaining accurate determination of the inside diameter of the pipe has been one of the causes which have heretofore prevented the use of the vibration method in direct determination of the density of a fluid.

For accurate determination of the density of a fluid, the numerical values representing the inside diameter and the outside diameter of the pipe and the density of the material of the pipe are required to be accurate within certain ranges. This problem is discussed below.

Let $\Delta f$ stand for the difference between the frequency $f$ of the pipe in its empty state and the frequency $f_x$ of the same pipe when filled with the fluid, and the frequency $f$ will be expressed by the equation shown below as Formula (7) (wherein, $f > f_x$).

$$f = f_x + \Delta f \qquad (7)$$

By substituting Formula (7) in Formula (6), there is derived the equation shown below as Formula (8).

$$\rho_x/\rho \,[\,(d_1/d_2)^2 - 1\,] = 2(\Delta f/f_x) + (\Delta f/f_x)^2$$

$$\rho_x/\rho \,[\,(d_1/d_2)^2 - 1\,] = 2(\Delta f/f_x) + (\Delta f/f_x)^2$$

(wherein, $f_x >> 1, f << 1$)

$$\rho_x/2\rho \,[\,(d_1/d_2)^2 - 1\,] = \Delta f/f_x \qquad (8)$$

The right member $\Delta f/f_x$ of the equation of Formula (8) represents the ratio of frequency variation. Increasing this variation ratio constitutes one requirement for the improvement of the accuracy of density determination.

Figure 2:
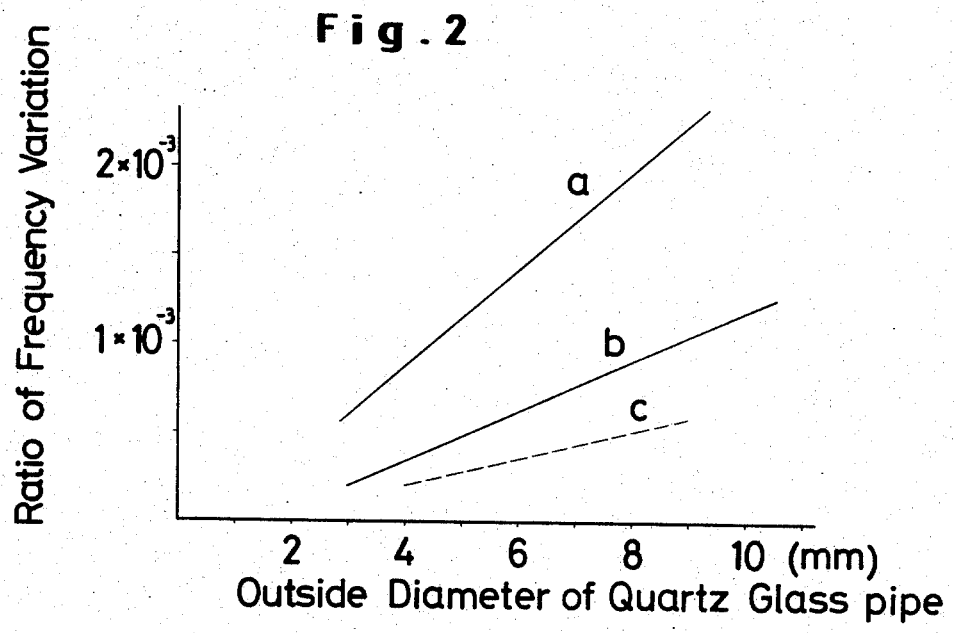
FIG. 2 is a graph showing the relationship between the change in the inside diameter of a quartz glass pipe and the change in the frequency.

FIG. 2 is a graph showing the relationship between the outside diameter $d$ of the quartz glass pipe and the ratio of frequency variation. In this graph, the curve $a$ represents the results of determination obtained for a gas having a density of about 0.0012 g/cm³ (the density of air at normal room temperature under normal pressure is 0.001209 g/cm³) in pipes having a wall thickness of 0.25 mm. This curve shows that the ratio of frequency variation $\Delta f/f_x$ increases in direct proportion to the outside diameter of the pipe, for example, from $1 \times 10^{-3}$ for about 4.2 mm of outside diameter to $2 \times 10^{-3}$ for 8 mm of outside diameter. The curve $b$ represents the ratio of frequency variation determined with respect to quartz glass pipes having a wall thickness of 0.5 mm. It is learnt consequently that the ratio of frequency variation decreases as the thickness of pipe wall increases and that, for the same wall thickness, the ratio of frequency variation increases in proportion to the increase in the outside diameter of pipe. The curve $c$ shows the ratio of frequency variation determined of steel pipes packed with a gas having a density of 0.0012 g/cm³. Since steel has a higher density ($\rho = 8$ g/cm³) than quartz glass ($\rho = 2.2$ g/cm³), the steel pipes, in spite of a smaller wall thickness of 0.25 mm, show a lower ratio of frequency variation than the quartz glass pipes even when all the other conditions are identical to those used on the latter pipes. When a steel pipe is used for the determination of the density of a gas having a density as low as 0.0012 g/cm³, the ratio of frequency variation is required to be accurate to the order of $10^{-7}$ in order to ensure the desired accuracy of determination. Accordingly, use of quartz glass pipes proves to be more advantageous for the determination of the density of gases having low values of density.

The graph of FIG. 2 indicates that the pipe to be used as a vibrating element is preferably made of material having a low density and that the ratio of frequency variation increases with the increasing outside diameter and the decreasing wall thickness of the pipe in use.

In order to determine the density of a gas having an approximate density of 0.0012 g/cm³ accurately to four significant digits, it is essential, as is evident from Formula (6), that the density of the pipe should be determined accurately to four significant digits, the outside and inside diameters of pipe to the relative accuracy of $1 \times 10^{-4}$ (approximately 1 $\mu$m), and the ratio of frequency variation of the pipe to the relative accuracy of $1 \times 10^{-6}$.

As already pointed out, however, it has been extremely difficult to determine the inside diameter of the pipe accurately to within 1 $\mu$m, although the outside diameter and the density of the pipe can be determined relatively accurately by the conventional methods.

The present invention relates to an apparatus whereby the inside diameter of the pipe being used as a vibrating element is determined accurately as the first step and then, on the basis of the value thus found, the density of a given fluid is directly determined with high accuracy. This invention is explained below with reference to FIG. 3 which illustrates one embodiment of the apparatus according to the present invention.

Figure 3:
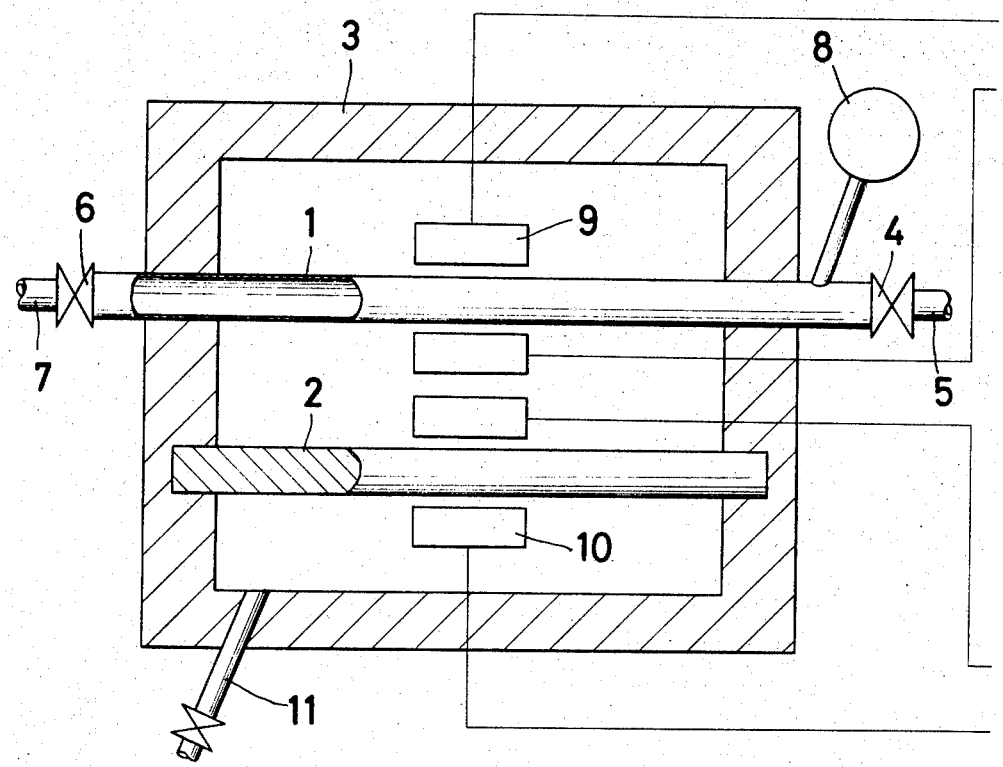
FIG. 3 is an explanatory view illustrating one embodiment of the apparatus according to the present invention.

Referring to FIG. 3, a pipe 1 and a bar 2 made of the same material and having the same outside diameter as the pipe 1 are disposed within a vacuum vessel 3, with the ends of the pipe and the bar fixedly fastened to the side walls of the vacuum vessel. The pipe 1 is provided at one end thereof via a valve 4 with an inlet 5 for introducing a fluid the density of which is to be determined. An outlet 7 adapted to discharge the fluid within the pipe 1 is connected via a valve 6 to the other end of the pipe. Denoted by 8 is a pressure gauge which is connected to the pipe 1 in such way as to permit measurement of the pressure of the fluid placed inside the pipe 1. Around the pipe 1 and the bar 2 inside the vacuum vessel are respectively provided vibrating means 9 and 10 adapted to vibrate the pipe and the bar. Denoted by 11 is an outlet for the vacuum vessel 3 which is adapted to evacuate the vessel of any air remaining therein and maintain a vacuum in the vessel thereafter.

First, a vacuum is produced inside the vacuum vessel 3 and inside the pipe 1. By means of the vibrating means 9 and 10, the pipe 1 and the bar 2 are vibrated and the frequency $f$ of the pipe 1 in the empty state and the frequency $f_o$ of the bar 2 are measured.

In the embodiment illustrated, a vacuum is separately produced inside the vessel 3 and the pipe 1. As a matter of course, a vacuum may simultaneously be produced therein by using a common vacuum pump.

The frequencies $f$ and $f_o$ are determined from the factors of Formulas (9) and (10) respectively.

$$f = J/l^2 \cdot \sqrt{E/\pi} \cdot \sqrt{1/16 \cdot (d^4_1 - d^4_2)/(d^2_1 = d^2_2)} \qquad (9)$$

$$f_o = J/l^2 \cdot \sqrt{E/\rho} \cdot \sqrt{1/16 \cdot d^2_1} \qquad (10)$$

If, in this case, the outside diameter $d_1$ of the pipe is already known, the Formula (9) and Formula (10) may be developed as shown below to yield Formula (11).

$$d^4_2 - d^2_1 \,(f/f_o)^2 \,d^2_2 + d^4_1 \,(f/f_o)^2 - d^4_1 = 0 \qquad (11)$$

Assuming $d^4 \,(f/f_o)^2 - d^4_1 = C$, $d^2_1 \,(f/f_o)^2 = B$, and $d^2_2 = X$ in the preceding formula, Formula (11) is converted into the equation shown below as Formula (12).

$$X^2 - BX + C = 0 \qquad (12)$$

By solving the equation of Formula (12), there are obtained $X = B \pm \sqrt{B^2 - 4C}/2$ and $d_2 = \sqrt{X}$.

As stated previously, the inside diameter $d_2$ of a pipe can easily be calculated indirectly from the frequency which is obtained of a bar having the same outside diameter as the pipe.

After the inside diameter of the pipe has been found accurately as mentioned, a fluid whose density is to be determined is introduced via the inlet 5 into the pipe. The valve 6 is closed the moment the interior of the pipe 1 is filled to capacity with the said fluid. The introduction of the fluid into the pipe is further continued until the pressure inside the pipe as measured by the pressure gauge 8 reaches a prescribed value. Thereafter, the valve 4 is closed. The pipe is vibrated and the frequency $f_x$ is measured. The density of the fluid can easily be calculated by using the frequency $f_x$ obtained for the packed pipe and the frequency $f$ obtained for the same pipe in the empty state in Formula (6). Fluids whose densities can be determined by this invention include not merely liquids but even gases having low values of density.

Figure 4:
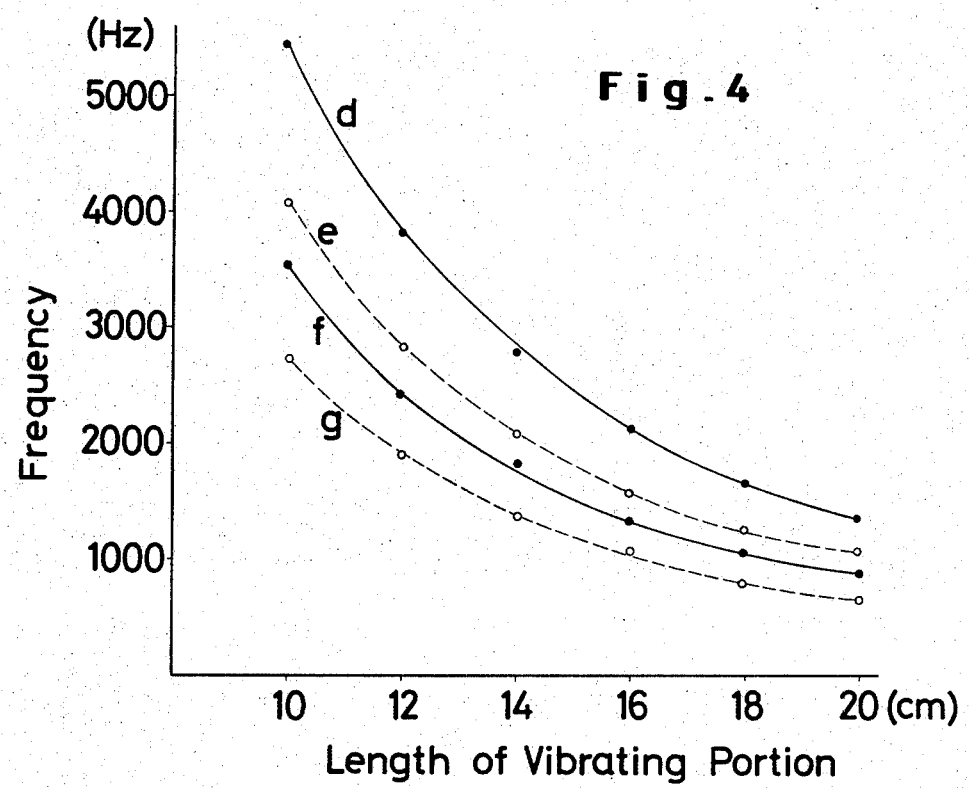
FIG. 4 is a graph comparing the characteristic frequency of a quartz glass pipe and that of a quartz glass bar.

Preferably the pipe to be used as a vibrating element is made of a material possessed of a low density and has a large outside diameter and a small wall thickness. The length of the vibrating portion of the pipe is a factor for determining the frequency but has no direct effect upon the sensitivity of determination. FIG. 4 shows an example of the relationship between the length of the vibrating portion and the frequency obtained for pipes and bars made of quartz glass and having identical outside diameters. In the graph of FIG. 4, the curve $d$ represents the results for a pipe 9 mm in outside diameter and 8 mm in inside diameter, the curve $e$ those for a pipe 6 mm in outside diameter and 5 mm in inside diameter, and the curve $g$ those for a bar 6 mm in outside diameter. Each curve shows the relationship between the length and the frequency. From the graph, it is evident that the characteristic frequency decreases with the increasing length of the vibrating portion.

In determining the density of gases having low values of density, quartz glass proves to be the optimal material for the pipe satisfying the aforementioned requirements for the vibrating element. In determining the density of liquids having high values of density, however, a metal pipe such as, for example, a steel pipe, proves to be more advantageous from the viewpoint of fabricating precision and strength.

Figure 5:
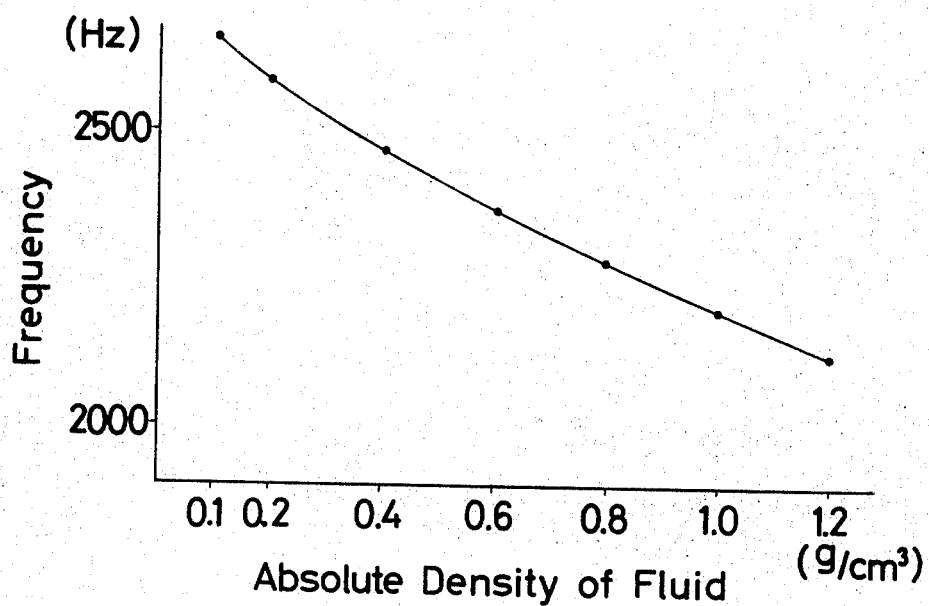
FIG. 5 is a graph showing an example of the relationship between the density and the frequency of a fluid packed in a steel pipe.

FIG. 5 is a graph showing the relationship between the density of a fluid placed in a steel pipe 10 mm in outside diameter, 9 mm in inside diameter, and 150 mm in length of vibrating portion and the frequency produced thereon.

In this case, the frequency obtained for the steel pipe in the empty state is about 2726.6 Hz and the frequency of the bar is 2026.2 Hz. When the steel pipe is filled with a liquid having an approximate density of 1.2 g/cm$^3$, the frequency is about 2,130 Hz. The frequency increases with the decreasing density of the liquid in the pipe.

Pipe made of Elinvar type alloys and of brass may be used in the place of the aforementioned pipes of quartz glass and steel.

As means for vibrating the pipe and the bar, electrostatic oscillation circuits or electromagnetic oscillation circuits of ordinary design may be used satisfactorily. In the former case, the pipe is required to be electroconductive and a metal film must be vacuum deposited on the outside of the pipe and bar of quartz glass.

The frequencies of the pipe and the bar are determined by the outside diameter and inside diameter, the density, and the length of the vibrating portion of the pipe. From the practical point of view, it is desirable to select vibrating elements of the type which produce frequency in the range of from 1,000 to 3,000 Hz. A vacuum on the order of 10$^{-3}$ is sufficient as the vacuum of the vacuum vessel.

If the temperature at the time the inside diameter of pipe is determined differs from the temperature at the time the frequency is determined for the pipe packed with the fluid, the frequency produced on the pipe will vary proportionally and cause an error in the determination. For this reason, it is preferable to select a material of the kind which shows little variation of frequency due to change in temperature. Metals have ratios of frequency variation against temperature on the order of $1 \times 10^{-5}/°C$ but show inferior detection sensitivity because of they have densities in the neighborhood of 8 g/cm$^3$. By contrast, quartz glass has a ratio of frequency variation against temperature on the order of $8 \times 10^{-5}/°C$ and shows superior detection sensitivity because its density approximates 2.2 g/cm$^3$. Where the temperature variation is limited within ±0.1° C, the stability of frequency is $1 \times 10^{-6}$ in the case of metals and only $8 \times 10^{-6}$ in the case of quartz glass. When it is required to determine frequency to four significant digits, the stability of frequency should be higher than at least $1 \times 10^{-6}$. Stability on the order of $8 \times 10^{-6}$ is insufficient for the purpose.

For the purpose of eliminating the aforementioned error caused by temperature variation, the empty pipe and the bar are vibrated within the apparatus illustrated in FIG. 3 to find the frequency for each and, after the pipe has been filled with the fluid to be tested, the pipe and the bar are again vibrated under the same conditions to find their frequencies.

Let $f$ stand for the frequency of the pipe and $f_o$ for the frequency of the bar found when the pipe is empty, $f'_x$ for the frequency of the pipe and $f'_o$ for the frequency of the bar found when the pipe is filled with the fluid, and there will be obtained the following three equations.

$$f - f_o = \Delta f$$

$$f'_x = f_x + f_x \beta \cdot t$$

$$f'_o = f_o + f_o \beta \cdot t$$

wherein, $\beta$ represents the frequency-temperature coefficient of the pipe and the bar, $t$ the difference between the temperature at the time the empty pipe is vibrated and the temperature at the time the pipe filled with the fluid is vibrated, and $f_x$ and $f_o$ the frequencies of the pipe and the bar where there is no temperature difference ($t = 0$). Here, $f'_o$ represents the frequency of the bar which is found when $f'_x$ is obtained and, therefore, it has a magnitude which reflects temperature error with respect to $f_o$. By finding $f_x$ as shown in Formula (13) from the aforementioned three equations and using the calculated value of $f_x$ in Formula (6), possible error due to temperature variation can be eliminated and the density $\rho_x$ of the fluid can be determined accurately.

$$f_x = f_o \cdot f'_x / f'_o \qquad (13)$$

Now, an explanation is given below concerning the internal pressure which occures within the pipe when the pipe is filled with the fluid for the purpose of density determination and the variation of inside and outside diameters of the pipe due to expansion.

Where the pipe has a small wall thickness, the variation ratio $\epsilon$ of the inside radius of the pipe is expressed by the equation of Formula (14), wherein $p$ stands for the internal pressure of the pipe, $r$ for the inside radius of the pipe, and $h$ for the wall thickness of the pipe.

$$\epsilon = \delta\gamma/\gamma = [(2-\nu)\gamma p]/2 E h \quad (14)$$

wherein, $E$ represents Young's modulus for the pipe, $\nu$ the Poisson ratio, and $\delta\gamma$ the amount of variation in radius.

In the case of quartz glass, the Poisson ratio $\nu$ is 0.2 and the Young's modulus $E$ is $6 \times 10^{11}$ dynes/cm². For a quartz glass pipe 0.6 cm in inside radius and 0.05 cm in wall thickness, the variation ratio $\epsilon$ is found as shown in Formula (15).

$$\epsilon = [(2-0.2) 0.6 \times p]/[2 \times 6 \times 10^{11} \times 0.05] = 1.8p \times 10^{-5} \quad (15)$$

The variation ratio $\epsilon$ of the inside radius is $1.8 \times 10^{-5}$ where the internal pressure is 1 kg/cm².

On the assumption that the variation in the wall thickness $h$ is negligible despite the variation $\delta\gamma$ in the inside radius so far as the internal pressure is small, the variation in the outside radius equally amounts to $\delta\gamma$ and the outside diameter is varied by the amount $d_1 + 2\delta\gamma = d'_1$ because the external pressure is zero. Similarly, the variation in the inside diameter is $d_2 + 2\delta\gamma = d'_2$. Since $\delta\gamma = \gamma\epsilon = d_2/2 \cdot \epsilon$, the expansions $d'_1$ and $d'_2$ in the inside and outside diameters of the pipe are found as shown in Formula (16).

$$d'_1 = d_1 + d_2\epsilon$$

$$d'_2 = d_2 + d_2\epsilon \quad (16)$$

As $d_1$ and $d_2$ are varied by the amounts $d'_1$ and $d'_2$ respectively, the variation $f'_x$ in the frequency is found from the former portion of Formula (6) as follows.

$$f'_x = f[1 + px/\rho[(d'_1/d'_2)^2 - 1]]^{-1/2} \quad (17)$$

Substitution of Formula (16) in Formula (17) yields Formula (18) through the following development.

$$\left(\frac{d_1'}{d_2'}\right)^2 = \frac{d_1^2\left(1+\frac{d_2}{d_1}\epsilon\right)^2}{d_2^2(1+\epsilon)^2} \doteq \frac{d_1^2}{d_2^2}\left[1+2\epsilon\left(\frac{d_2}{d_1}-1\right)\right]$$

$$= \left(\frac{d_1}{d_2}\right)^2 + 2\epsilon\left(\frac{d_1}{d_2}\right)^2\left(\frac{d_2}{d_1}-1\right)$$

$$f_x' = f\left\{1 + \frac{\rho_x}{\rho\left[\frac{d_1^2}{d_2^2}\left[1+2\epsilon\left(\frac{d_2}{d_1}-1\right)\right]-1\right]}\right\}^{-\frac{1}{2}}$$

$$f_x' = f_x\left[1 + \frac{1}{2}\frac{2\epsilon\frac{d_1^2}{d_2^2}\left(\frac{d_2}{d_1}-1\right)}{\left(\frac{d_1^2}{d_2^2}-1\right)}\right] \quad (18)$$

Consequently, $$\frac{\epsilon\frac{d_1^2}{d_2^2}\left(\frac{d_2}{d_1}-1\right)}{\left(\frac{d_1^2}{d_2^2}-1\right)}$$

is derived as the ratio of frequency variation due to pressure change.

Steel has a higher value of Young's modulus and shows a smaller variation ratio due to pressure change than quartz glass. In a pipe measuring 6 mm in outside diameter and 5 mm in inside diameter, the variation ratio $\epsilon$ is practically the same between quartz glass and steel, the value being $1.1 \times 10^{-5}$ for the former and $0.8 \times 10^{-5}$ for the latter. Generally, the practical wall thickness of the pipe is limited to 0.5 mm, with due consideration for accuracy of determination and strength. Therefore, the variation ratio of frequency due to pressure change is less than $1 \times 10^{-5}$ per 1 kg/cm². If the fluid whose density is to be determined is a liquid and has a specific gravity on the order of 1, then the frequency need be measured accurately to only within $10^{-3}$ in order that the density may be determined accurately to four significant digits. This means that accurate determination can be obtained over a fairly wide range of pressures. In the case of a gas, however, the accuracy of frequency measurement is required to reach the level of $1 \times 10^{-6}$ in order that the determination may be made accurately to four digits. Thus, the pressure has an important effect upon the determination of density of a gas.

For the purpose of precluding any error from occurring in the variation of frequency in consequence of the deformation of the pipe by pressure, the present invention proposes to determine the density of two different fluids at the same temperature under the same pressure and, in accordance with the results of the determination, make adequate compensation for the error ascribable to pressure.

Let $f'_{mp}$ stand for the frequency determined for one fluid $m$ under a pressure of $p_1$. The value $f'_{mp}$ includes an increment $\Delta f_p$ of frequency corresponding to the variation due to pressure. Similarly with respect to the other fluid $n$, since both pressure and temperature are unchanged, the increment $\Delta f_p$ of frequency included in the frequency $f'_{np}$ is equal to the increment which is included in the frequency $f'_{mp}$ mentioned above. Thus, there are derived equations of Formula (19).

$$f_{mp} + \Delta f_p = f'_{mp}$$

$$f_{np} + \Delta f_p = f'_{np} \quad (19)$$

The equations of Formula (19) could be solved if the ratio $K$ of the frequency $f_{mp}$ were known. In actuality, however, the ratio $K$ of $f_{np}$ to $f_{mp}$ cannot be found directly because the values which can be determined are the increments $f'_{mp}$ and $f'_{np}$ corresponding respectively to the said frequencies $f_{mp}$ and $f_{np}$. It suffices for the solution of these equations if the ratio $K'$ of $f'_{np}$ to $f'_{mp}$ can be regarded as virtually equalling the ratio K. Since $K$ is $f_{np}/f_{mp}$, Formula (19) can be developed as shown below.

$$f_{mp} + \Delta f_p = f'_{mp}$$

$$K f_{mp} + \Delta f_p = f'_{np}$$

$$f_{mp}(K-1) = f'_{np} - f'_{mp} = \Delta f'_{m\_n}$$

$$K' = \frac{f_{np}'}{f_{mp}'} = \frac{f_{np}\left(1+\frac{\Delta f_p}{f_{np}}\right)}{f_{mp}\left(1+\frac{\Delta f_p}{f_{mp}}\right)}$$

$$= \frac{f_{np}}{f_{mp}}\left(1 + \frac{\Delta f_p}{f_{np}} - \frac{\Delta f_p}{f_{mp}} - \frac{\Delta f_p^2}{f_{mp}f_{np}}\right)$$

It is apparent from the preceding equations that the difference between $K$ and $K'$ can be given by this expression:

$$f_{np}/f_{mp}[(1 + (\Delta f_p/f_{np}) - (\Delta f_p/f_{mp}) - (\Delta f_p^2/f_{mp}f_{np})]$$

If the densities determined for the fluids having the frequencies $f_{np}$ and $f_{mp}$ are on the same order of accuracy, then $f_{np}$ is approximately equal to $f_{mp}$, the difference $\Delta f_p/f_{anp} - \Delta f_p/f_{mp}$ is accurate to within $10^{-5}$, the increment $f_p$ is accurate on the order of $10^{-3}$, and the values of $f_{mp}$ and $f_{np}$ are accurate on the order of $10^3$. Therefore, the term $\Delta f^2_p/f_{mp} \cdot f_{np}$ may well be regarded as equalling 0. For practical purposes, therefore, the calculation of Formula (19) may safely be carried out on the assumption of $K = K' = f'_{np}/f'_{mp}$. From Formula (19), the increment $\Delta f_p$ is obtained and the values of $f_{mp}$ and $f_{np}$ are derived in consequence. These values $f_{mp}$ and $f_{np}$ represent the frequencies which are perfectly free from any error ascribable to the effect of pressure. By using these values in Formula (6), the density of the fluid under test can be determined without being affected by the error due to pressure.

A typical determination performed by using the apparatus of the present invention is described below with reference to FIG. 6.

Figure 6:
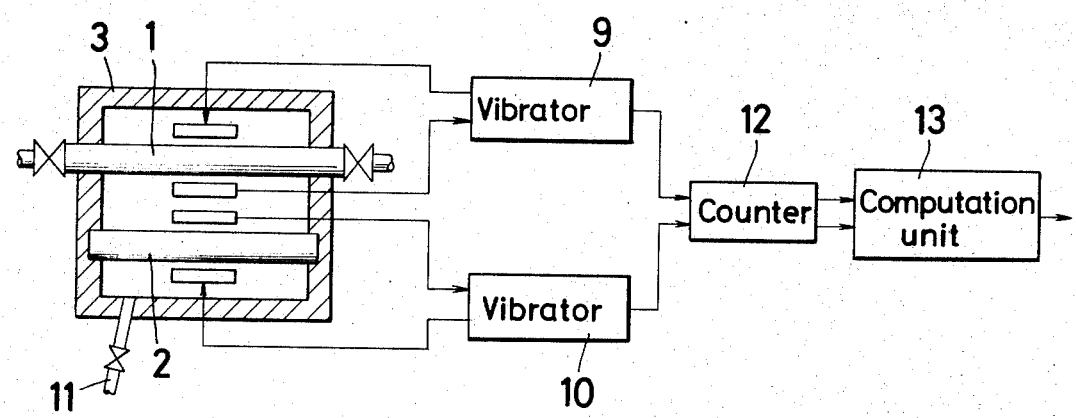
FIG. 6 is a schematic view showing how the determination of density is carried out by the apparatus according to the present invention.

Referring to FIG. 6, a quartz glass pipe 1 and a quartz glass bar 2, of identical outside diameter, are disposed within a vacuum vessel 3, with the ends thereof fixedly fastened to the side walls of the vessel. The interior of pipe 1 and the interior of vessel 3 are evacuated to produce a vacuum. Thereafter, the vibrating means 9 and 10 are actuated to vibrate the pipe and the bar. The frequency of the pipe and that of the bar are found on the counter 12, and the values found are forwarded to a consumption unit 13 whereby the inside diameter of the pipe is calculated indirectly.

Specifically, when a quartz glass pipe and a quartz glass bar, both of an identical diameter of 10 mm, are vibrated, the frequency $f$ of the pipe is found to be 2726.6 Hz and the frequency $f_o$ of the bar is found to be 2026.2 Hz. If these values are used in Formula (11), there will be obtained the following results.

$$C = d^4_1 (f/f_o)^2 - d^4_1 = 1^4 (2726.6/2026.2)^2 - 1^4 = 0.810832$$

$$B = d^2_1 (f/f_o)^2 = 1^2 (2726.6/2026.2)^2 = 1.810832$$

$$X = b \pm \sqrt{B^2 - 4C}/2 = 1.810832 \; \sqrt{(1.810832)^2 - 4 \times 0.810832}/2 = 0.8107$$

$$d_2 = \sqrt{X} = \sqrt{0.8107} = 0.900$$

Consequently, the inside diameter of the pipe is found to be 0.900 cm.

Then, the interior of pipe 1 is filled with ether at normal pressure and room temperature such ether serving as the fluid whose density is to be determined. The pipe is then vibrated under the same condition as before. In this case, the frequency $f_x$ of the filled pipe is found to be 1750.5 Hz. When this value is used in Formula (6) wherein the density of quartz glass is take as 2.2 g/cm³, there results the following computation which will determined the density $\rho_x = 0.7359$ of either as indicated.

$$\rho_x = \rho[(d_1/d_2)^2 - 1][(f/f_x)_2 - 1]$$

$$= 2.20 [(1.000/0.900)^2 - 1] [(2726.6/1750.5)^2 - 1]$$

$$= 0.7359 \; (g/cm^3)$$

The preceding value holds good on condition that there is no difference between the temperature at the time the inside diameter of pipe is measured and the temperature at the time the filled pipe is vibrated and that no problem is involved with respect to the pressure which builds up when the ether is introduced. If there is a difference in temperature or if there is a problem concerning the pressure, then the computation must be carried out by making adequated compensation therefor in accordance with Formula (13) or Formula (19).

As is evident from the foregoing description, the apparatus according to the present invention has a pipe and a bar, made of the same material and having the same outside diameter, disposed inside a vacuum vessel, with the ends thereof fixedly fastened to the side walls of the vessel. By simply vibrating the pipe and the bar and then finding the frequency thereof, this apparatus can directly and accurately determine the density of a given fluid while virtually completely precluding any error ascribable to variation in temperature or pressure. While the conventional devices have barely been able to determine the specific gravity of a fluid, the apparatus of the present invention is capable of directly determining the density of a fluid. Thus, this apparatus can be utilized advantageously for determination of the density of natural gas, propane gas, etc.

I claim:

1. An apparatus for accurate determination of the inside diameter of a pipe, comprising a vacuum vessel, a pipe and a bar disposed parallelly to each other inside the vacuum vessel with their ends fixedly fastened to the side walls thereof, the pipe and bar being made of the same material and being of identical outside diameter, a vibrating means adapted to vibrate the pipe and bar under the same condition, and a means for detecting the frequency of vibration caused in the pipe and the bar by the vibrating means, the inside diameter of the said pipe being determined from the frequency of the pipe and the frequency of the bar detected by the said detecting means.

2. An apparatus for accurate determination of the density of a fluid, comprising a vacuum vessel, a pipe and a bar disposed parallelly to each other inside the vacuum vessel with their ends fixedly fastened to the side walls thereof, the pipe and bar being made of the same material and being of identical outside diameter, a vibrating means adapted to vibrate the pipe and bar under the same condition, and a means for detecting the frequency of vibration caused in the pipe and the bar by the vibrating means, the inside diameter of the pipe being determined from the frequency of the pipe and the frequency of the bar and, subsequently, the density of a fluid introduced into the pipe being determined from the inside diameter previously determined and the frequency of the said pipe filled with the fluid.

* * * * *